United States Patent [19]

White

[11] Patent Number: 5,718,451
[45] Date of Patent: Feb. 17, 1998

[54] INTEGRATED VEHICLE OCCUPANT ENERGY MANAGEMENT SYSTEM AND METHOD

[75] Inventor: Craig W. White, Grosse Pointe, Mich.

[73] Assignee: Automotive Systems Laboratory, Inc., Farmington Hills, Mich.

[21] Appl. No.: 606,649

[22] Filed: Feb. 26, 1996

[51] Int. Cl.$^6$ .................................................. B60R 21/32
[52] U.S. Cl. .................... 280/735; 180/268; 180/271; 280/806; 307/10.1
[58] Field of Search ..................... 280/735, 806, 280/807; 180/271, 268; 307/10.1

[56] References Cited

U.S. PATENT DOCUMENTS

| | | | |
|---|---|---|---|
| 3,917,023 | 11/1975 | De Rosa | 280/735 |
| 4,984,651 | 1/1991 | Grosch et al. | 280/735 |
| 5,080,188 | 1/1992 | Okuhara et al. | 280/735 |
| 5,332,262 | 7/1994 | Chou | 280/806 |
| 5,398,185 | 3/1995 | Omura | 180/268 |
| 5,558,370 | 9/1996 | Behr | 280/807 |

FOREIGN PATENT DOCUMENTS 4-191151  7/1992  Japan .................. 280/806

*Primary Examiner*—Eric D. Culbreth
*Attorney, Agent, or Firm*—Lyon, P.C.

[57] ABSTRACT

An integrated vehicle occupant energy management system (10) and method (100) performs front and side impact detection (102), determination of occupant position and type (106), and control of seat belt tension (104 and 108) and deployment of one or more air bags (114) from a single unit (12) position at the vehicle's b-pillar. Real time and dynamic management of occupant energy is provided to optimize energy absorption through seat belt tensioning as a first response to a crash situation, and follow-up deployment of one or more air bags as needed.

1 Claim, 2 Drawing Sheets

INTEGRATED VEHICLE OCCUPANT ENERGY MANAGEMENT SYSTEM AND METHOD

BACKGROUND OF THE INVENTION

The present invention generally relates to systems and methods of controlling deployment or operation of a plurality of different types of vehicle occupant safety restraint devices, and more particularly, to an improved method and system which provides dynamic management of occupant energy during a vehicle crash.

Generally speaking, systems for controlling actuation or deployment of vehicle occupant safety restraint devices, such as air bags and seat belts, are conventionally implemented as individual and/or isolated components mounted in various locations on the vehicle. As a result, a conventional system which tries to implement a comprehensive occupant crash protection strategy involving front and side impact detection, occupant position detection, and seat belt tension management becomes prohibitively expensive due to the associated costs of the distributed communication network, and multiple processing units, hardware and housings. Thus, a need exists for a vehicle occupant crash protection system and method which is able to provide a comprehensive occupant protection strategy in a cost effective manner.

SUMMARY OF THE INVENTION

The present invention solves the aforesaid problem by utilizing an integrated vehicle occupant energy management system and method which effectively performs front and side impact detection, occupant position sensing/measurement, and control of seat belt tension and air bag(s) deployment from a single unit centrally positioned on the vehicle, such as at the vehicle's b-pillar. The present invention provides an economical and comprehensive occupant energy management system and method which allows real-time dynamic control over actuation of multiple types of occupant safety restrain devices, and more particularly, to optimize the energy absorption capability of a seat belt by controlling the tension of the seat belt as a first response to a crash situation, and follow-up deployment as needed of other restraint devices, such as one or more air bags.

Therefore, an object of the present invention is to provide an occupant energy management system and method which allows economic as well as optimized control over actuation or deployment of one or more different types of safety restraint devices.

Another object of the present invention is to provide dynamic and real-time seat belt tension control as a first crash response, with subsequent deployment of one or more air bags based on such factors as occupant type, occupant position, and force exerted on seat belt webbing.

Yet another objection of the present invention is to provide a comprehensive occupant energy management system which is integrated into a single unit positioned at a vehicle's b-pillar.

In accordance with these and other objects, the present invention provides an integrated system capable of providing comprehensive management of occupant energy by dynamically controlling operation of a plurality of different occupant safety restraint devices comprising a crash sensor unit mounted to a side pillar of the vehicle, wherein the crash sensor unit comprises means for detecting a frontal vehicle impact, means for detecting a side vehicle impact, means for continually monitoring tension force exerted on a seat belt, and control means responsive to the frontal impact detecting means, the side impact detection means, and the seat belt tension monitoring means for selectively controlling the amount and rate of allowable seat belt payout, and the deployment of one or more air bags if necessary.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
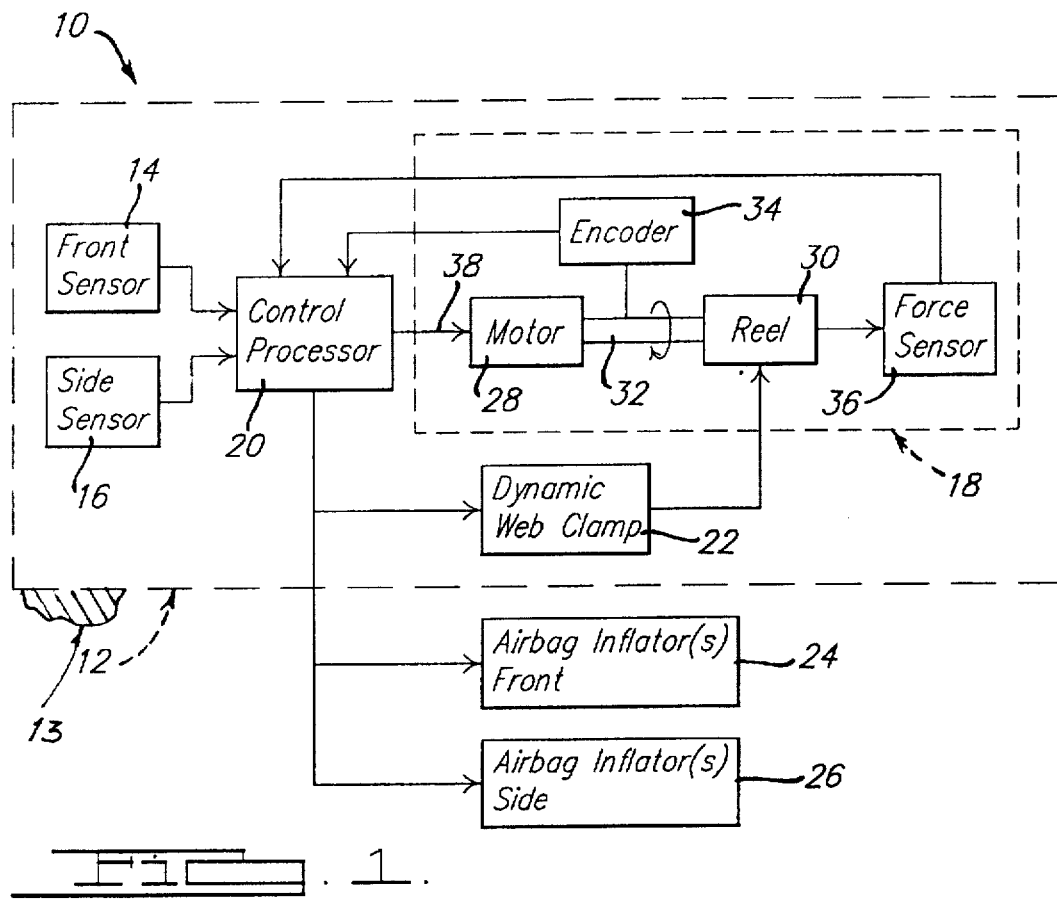
FIG. 1 is a block diagram of an integrated vehicle occupant energy management system in accordance with the present invention.

FIG. 1 shows a block diagram of a vehicle occupant energy management system 10 in accordance with the present invention, wherein each of the system's subcomponents are integrated and housed within a single control unit 12 positioned at the vehicle's b-pillar 13. The basic subcomponents consist of: one or more frontal collision/impact detection sensors 14 capable of producing an analog output, one or more side collision/impact sensors 16 capable of producing an analog output, electronic seat belt tensioning system 18, a main control microprocessor/system 20, and a dynamic seat belt web clamping mechanism 22. As more fully described hereinbelow, the control unit 12, primarily via the main control system 20, provides comprehensive control over deployment and/or actuation of a plurality of occupant safety restraint devices, such as one or more front air bag inflators 24, one or more side air bag inflators 26, individual and variable inflation profile type front or side air bag inflators, or dynamic tensioning of a seat belt (not shown). While the preferred embodiment shows the use of analog collision sensors 14 and 16, one of ordinary skill in the art will readily appreciate such an arrangement is not to be construed as a limiting feature of the present invention, and that any type of known collision sensor can be employed as long as the sensor(s) can reliably detect front and side collisions when located at a b-pillar.

The electronic seat belt tensioning system 18 includes a motor 28, such as a step motor, coupled to seat belt reel mechanism 30 via a motor shaft 32. The seat belt can be a lap belt and/or a shoulder belt. A shaft-encoder 34 is coupled to the shaft 32 to provide a quantified output of the amount and direction of shaft rotation for control processor 20. One of ordinary skill in the art will readily appreciate that shaft encoders are generally known, and that the shaft-encoder 34 can be arranged with two channels or an absolute position read out to provide the necessary directional information and the position counts, and the belt reel mechanism 30 can be designed for easy replacement separate from the motor 28 and shaft-encoder 34 assembly, so that either may be replaced or serviced without affecting the other.

The control processor 20 receives inputs from the shaft-encoder 34, the collision sensors 14 and 16, and a force sensor 36 coupled to the seat belt reel mechanism 30 and/or seat belt webbing. The force sensor 36 provides an output indicative of the amount of force being exerted on the seat belt webbing at any particular moment in time. The control processor 20 analyzes the input data to control actuation of the motor 12 via a control line 38, thereby controlling the operation of the seat belt reel mechanism 30 to regulate the seat belt tension. In nonemergency situations, the control processor 20 monitors the shaft-encoder input and/or a belt-coupled switch input (not shown) to determine whether the seat belt is unwound and/or unused. If the belt is unwound and/or unused, the processor 20 activates the motor 28 to wind the seat belt back onto the belt reel mechanism 30. Any existing vehicle circuit which is activated by a vehicle door being opened can be used to initiate a "housekeeping" operation if the vehicle is entered, belts are unwound but unused, and the vehicle is exited without being started. The motor 28 provides a nominal winding tension which retracts the belt to the stored position. This tension can be overcome as the occupant unwinds and buckles the belt.

As the belt is deployed, the shaft-encoder allows the electronic control processor 20 to detect deployment of the belt and to count off the amount of belt paid out during the deployment process. When the belt is buckled, the retracting force remains and the control process 20 counts off the amount of belt retracted. The amount of belt paid out can be used by the processor 20 to determine whether an occupant is actually present.

After a certain time period, the retracting force is applied to snug the belt tension while the processor 20 tracks the counts. After removal of excess slack from the belt, the winding tension applied by the motor would be substantially reduced to zero. Thus, the belt would be in a tensionless state during normal use so that the occupant would not be irritated by continuous belt tension such as exhibited with typical spring-loaded belt retractors. The amount of belt paid out is continuously tracked, with several counts of belt pay out being tolerated without restoring belt tension. If minor occupant motions cause additional belt to be unwound over what the system tolerates, the system will wind back the belt to the previously stored position.

The processor 20 continues to monitor the belt pay out for sensing occupant position. More specifically, belt payout information can be analyzed by a suitable algorithm in processor 20 which will determine the occupant's position/distance relative to a point of air bag deployment based on the known dimensions of the vehicle and a fixed seat belt anchoring point. In addition, occupant "type" can be determined by tracking seat belt movement typically incurred during nonemergency driving conditions, and comparing the tracked data with prestored profile data representative of how different types of occupants react. The processor 20 determines occupant "type" by finding the closest profile match.

If the processor 20 determines that the occupant is in an unsafe seating position, the system 10 can illuminate a warning lamp and/or cause the retracting tension to increase to a higher level of tensioning, thereby creating a "tugging" process on the occupant. Further, if processor 20 detects that the seat belt is not being used by the occupant, the processor 20 switches over to operate under a conventional crash discrimination algorithm as a default measure, thereby providing the inflation of the air bag(s) as the primary response to a crash.

Figure 2:
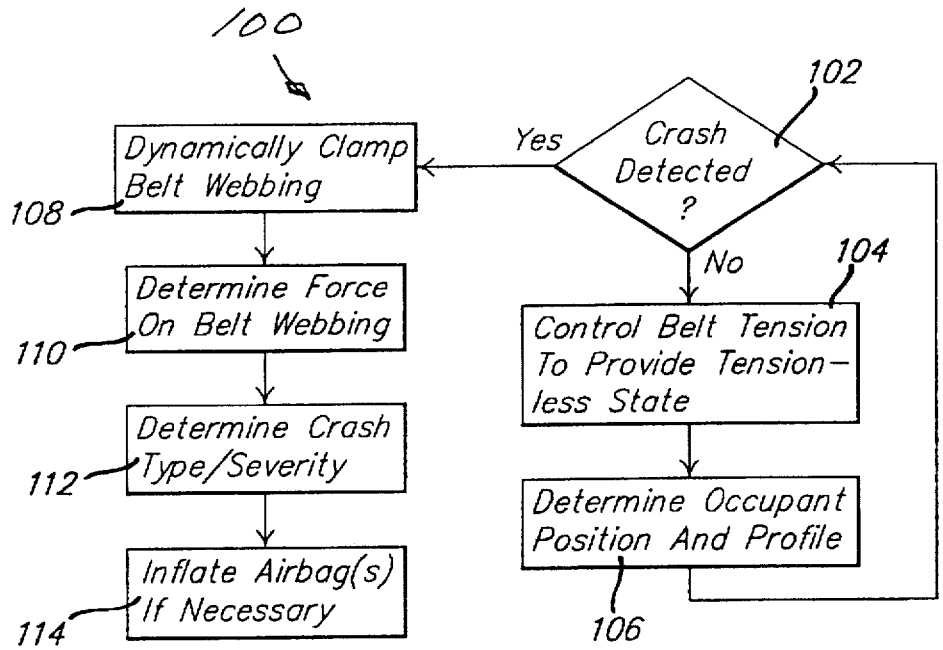
FIG. 2 is a flow chart illustrating the safety restraint control operation of the present invention.

Referring now to FIG. 2, a flow chart 100 illustrates the overall operation of the comprehensive occupant energy management system in accordance with the present invention. As shown at step 102, the processor 20 is continuously monitoring the plurality of sensors inputs to determine whether a front and/or side impact has occurred. In the absence of impact detection, at step 104 the processor 20 controls seat belt tensioning to provide a "tensionless" state, and at step 106 determines occupant as position and profile, described above.

If an impact is detected, as a first line of crash protection, processor 20 will actuate dynamic clamping of the seat belt webbing at step 108, such as more fully described hereinbelow in connection with FIG. 3. The dynamic web clamping functions to interactively control the speed and amount of seat belt payment to provide maximum occupant energy absorption and/or dispersion to reduce the need for deployment of other safety restraint devices, such as one or more air bags, to only severe vehicle crashes. As part of this dynamic and interactive control, processor 20 monitors at step 110 the amount of force being exerted on the seat belt webbing, and at step 112, analyzes the impact sensor outputs in accordance with a suitable crash algorithm to determine crash type and/or severity. Based on these factors, i.e., occupant position, occupant profile, crash type and severity, and force exerted on seat belt webbing, processor 20 controls inflation of one or more air bags at step 114.

Figure 3A:
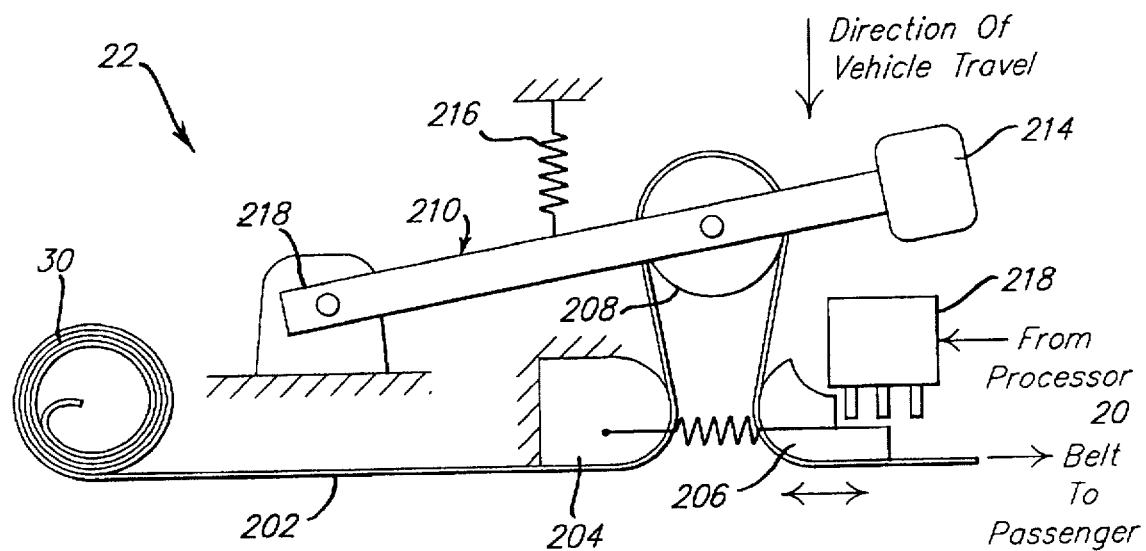
FIG. 3(a) is a schematic representation of a dynamic seat belt webbing clamp arrangement.
Figure 3B:
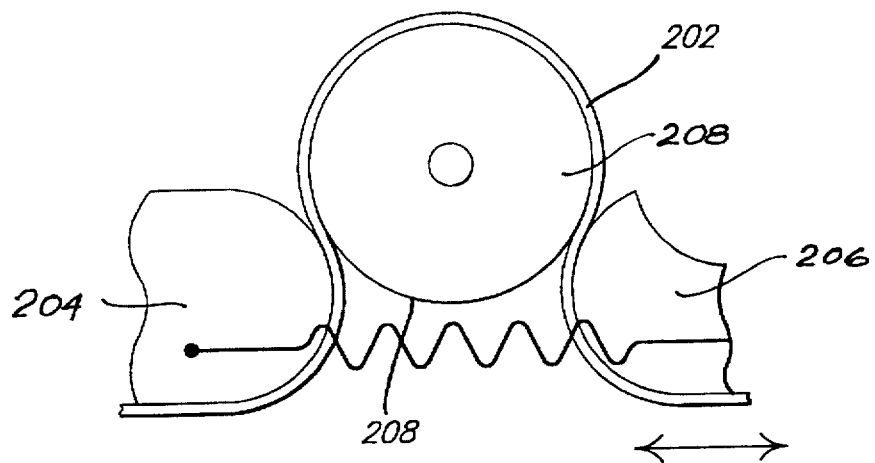
FIG. 3(b) is an enlarged view of the spool and pinch arms of FIG. 3(a) in the belt locking condition.

Referring now to FIGS. 3(a) and (b), there is shown a schematic representation of one possible arrangement for a dynamic seat belt webbing clamp 22 in accordance with the present invention. Seat belt webbing 202 is deployed from the seat belt reel 30 to a latch mechanism via a fixed pinch arm 204, moveable pinch arm 206 and a spool 208 mounted to a vehicle accelerator sensing lever 210. The vehicle acceleration sensing lever 210 is pivotably anchored at one end 212, while the other end is provided with a mass 214 which causes the arm to pivot in the direction of the arrow in response to vehicle acceleration. A spring 216 biases the lever 210 away from the web pinching arms 204 and 206 so as to permit the webbing 202 to move freely in nonemergency situations. However, in hard braking situations, the spring biasing of spring 216 will be overcome and the pivot lever 210 will move to place spool 208 into engagement with the pinch arms 204 and 206 such as shown in FIG. 3(b). The moveable pinch arm 206 is spring biased toward the fixed pinch arm 204 so as to create a friction which impedes the rate of payout of the belt webbing 202.

Movement of the pinch arm 206 is further controlled by processor 20 via a solenoid arrangement 218. More specifically, as described above, in a crash situation, processor 20 will control solenoid 218 to position pinch arm 206 relative to fixed pinch arm 204 and spool 208 so as to dynamically control the restriction on belt webbing payout.

Thus, the present invention advantageously provides an optimized and comprehensive occupant energy management system all from a single location on the vehicle, such as the b-pillar. The system utilizes shared hardware and a centralized processor to significantly reduce cost and size of the system. It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. An integrated vehicle crash detection system capable of providing comprehensive management of occupant energy by dynamically controlling operation of a plurality of different occupant safety restraint devices comprises:

a crash sensor unit mounted to a side pillar of the vehicle, said crash sensor unit comprising:

means for detecting a frontal vehicle impact;

means for detecting a side vehicle impact;

means for continually monitoring tension force exerted on a seat belt; and control means responsive to said frontal impact detecting means, said side impact detection means, and said seat belt tension monitoring means for selectively controlling an amount and rate of allowable seat belt payout, and deployment of one or more air bags when a predetermined force is exceeded.

* * * * *